United States Patent

Cwik et al.

[11] Patent Number: 5,984,372
[45] Date of Patent: Nov. 16, 1999

[54] INTEGRATED FLANGE-MESH RING ASSEMBLY FOR DECOUPLER APPARATUS

[75] Inventors: Scott C. Cwik; Robert C. Clarke, both of Carol Stream, Ill.

[73] Assignee: Senior Engineering Investments AG, Switzerland

[21] Appl. No.: 08/986,105

[22] Filed: Dec. 5, 1997

Related U.S. Application Data

[63] Continuation-in-part of application No. 08/838,601, Apr. 10, 1997.

[51] Int. Cl.⁶ .................................................... F16L 11/12
[52] U.S. Cl. ........................... 285/49; 285/226; 285/300; 29/454; 29/890.14
[58] Field of Search ............................. 285/49, 226, 227, 285/228, 229, 299, 300; 29/454, 890.14

[56] References Cited

U.S. PATENT DOCUMENTS

| 247,591 | 9/1881 | White . |
| 1,167,895 | 1/1916 | Fulton . |
| 1,203,602 | 11/1916 | Fulton . |
| 1,246,427 | 11/1917 | Heydon . |
| 1,505,121 | 8/1924 | Allport . |
| 1,744,467 | 1/1930 | Greene . |
| 1,968,715 | 7/1934 | Slade ........................................ 285/162 |
| 2,014,355 | 9/1935 | Hussman ..................................... 285/90 |
| 2,196,671 | 4/1940 | Gille et al. ................................. 297/11 |
| 2,216,468 | 10/1940 | Farrar ........................................ 29/157 |
| 2,358,291 | 9/1944 | Fentress ................................... 285/97.1 |
| 2,470,989 | 5/1949 | Keller et al. ............................ 285/97.3 |
| 2,514,059 | 7/1950 | Hicks et al. ................................ 285/90 |
| 2,712,456 | 7/1955 | McCreery ................................... 285/90 |
| 2,931,669 | 4/1960 | McDonald ................................. 285/45 |
| 3,549,780 | 12/1970 | Graneau ..................................... 174/21 |
| 3,692,337 | 9/1972 | Mischel ................................... 285/226 |

(List continued on next page.)

FOREIGN PATENT DOCUMENTS

| 640487 | 5/1962 | Canada ..................................... 198/12 |
| 0 208 128 | 3/1990 | European Pat. Off. . |
| 0 573 764 | 12/1993 | European Pat. Off. . |
| 0 575 727 | 12/1993 | European Pat. Off. . |
| 0 681 097 | 2/1995 | European Pat. Off. . |
| 0 681 097 | 11/1995 | European Pat. Off. . |
| 721 497 | 3/1932 | France .......................................... 5/3 |
| 895 016 | 1/1945 | France .......................................... 5/3 |
| 2 660 046 | 9/1991 | France . |
| 1 142 257 | 1/1963 | Germany . |
| 25 11 777 | 9/1976 | Germany . |
| 33 21 382 | 2/1984 | Germany . |
| 593009 | 5/1959 | Italy . |
| 2-129489 | 5/1990 | Japan . |
| 43601 | 1/1927 | Norway . |
| 542208 | 12/1941 | United Kingdom . |
| 619276 | 3/1949 | United Kingdom . |
| 662235 | 12/1951 | United Kingdom . |
| 2 277 969 | 11/1994 | United Kingdom . |
| 2 278 901 | 12/1994 | United Kingdom . |

OTHER PUBLICATIONS

United States Statutory Invention Registration, Reg. No. : H1101; Published: Sep. 1, 1992; Inventor: Ronald E. Waclalwik: Titled;Structural Vibration and Shock Isolation in a High Pressure Environment.

*Primary Examiner*—Dave W. Arola
*Attorney, Agent, or Firm*—Dick and Harris

[57] ABSTRACT

A vibration decoupling connector apparatus, for decoupling vibrations, for example, along the components of an internal combustion engine exhaust system. The flexible connector apparatus is provided for connecting first and second components in the exhaust system, and includes a bellows for accommodating relative movement between the first and second components. The flexible connector apparatus includes an annular vibration damping member connecting a down pipe to a mounting member for permitting restricted axial, lateral and angular movement of the down pipe, relative to the mounting member, which may be affixed to an exhaust manifold, for example. The apparatus also includes a sealing construction which enables weldless, gasketless connection of the bellows.

22 Claims, 13 Drawing Sheets

U.S. PATENT DOCUMENTS

| | | | |
|---|---|---|---|
| 3,820,829 | 6/1974 | Hasselbacher et al. | 285/226 |
| 3,997,192 | 12/1976 | Hansen | 285/5 |
| 4,121,860 | 10/1978 | Hoffman | 285/226 |
| 4,511,162 | 4/1985 | Broyles | 285/93 |
| 4,659,117 | 4/1987 | Holzhausen et al. | 285/49 |
| 4,748,836 | 6/1988 | Hoeboer et al. | 72/58 |
| 4,792,161 | 12/1988 | Usui | 285/45 |
| 4,854,611 | 8/1989 | Press | 285/3 |
| 4,875,716 | 10/1989 | Winzen et al. | 285/137.1 |
| 4,958,860 | 9/1990 | Akitsu | 285/49 |
| 5,013,072 | 5/1991 | Roth | 285/233 |
| 5,358,287 | 10/1994 | Winzen | 285/227 |
| 5,482,330 | 1/1996 | Holzhausen | 285/226 |
| 5,506,376 | 4/1996 | Gödel | 181/208 |
| 5,639,127 | 6/1997 | Davey | 285/49 |
| 5,639,137 | 6/1997 | Davey | 285/227 |
| 5,653,478 | 8/1997 | McGurk et al. | 285/227 |

FLANGE

INLET TUBE

OUTLET TUBE

MESH RING

END CAP

WELD & TELESCOPE TUBING

HYDROFORM FLANGE & BELLOWS
1-UP SHOWN
3-UP RECOMMENDED

TRIM BELLOWS NECK BOTH ENDS

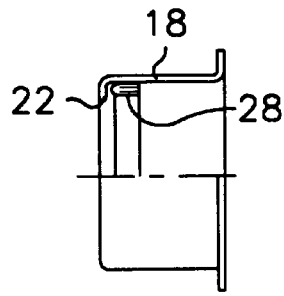
ASSEMBLE MESH RING IN INLET TUBE
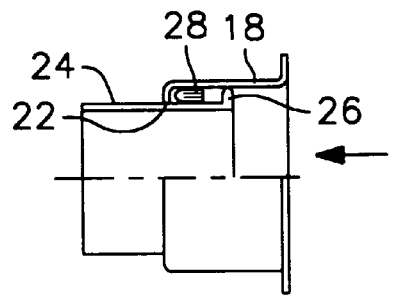
ASSEMBLE OUTLET TUBE INTO INLET TUBE ASSEMBLY
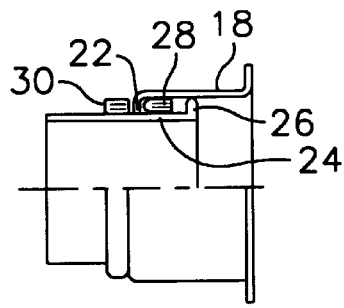
ASSEMBLE MESH RING ONTO OUTLET TUBE
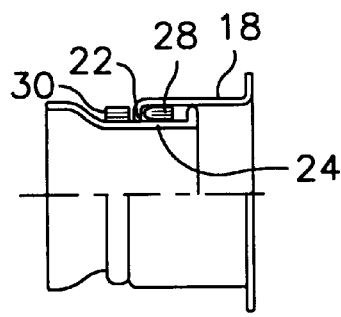
FORM TRANSITION ON OUTLET TUBE

ASSEMBLE PART 1 TO PART 2

ASSEMBLE & SIZE END CAP

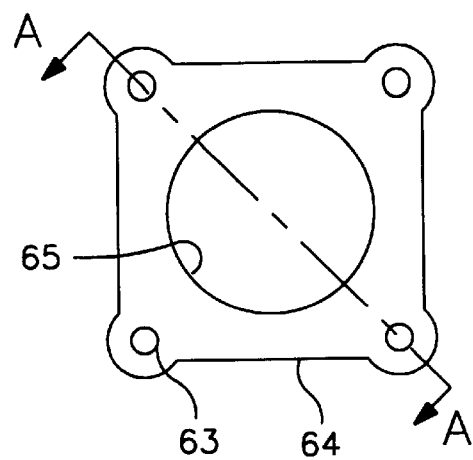
FIG. 18b
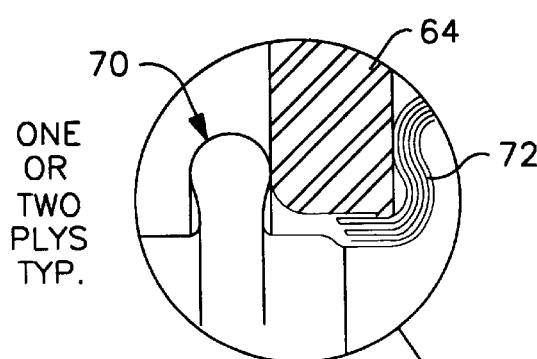
ONE OR TWO PLYS TYP.
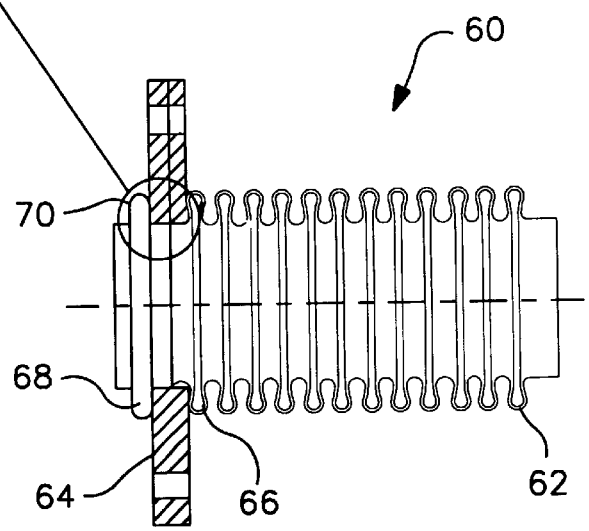
FIG. 18a

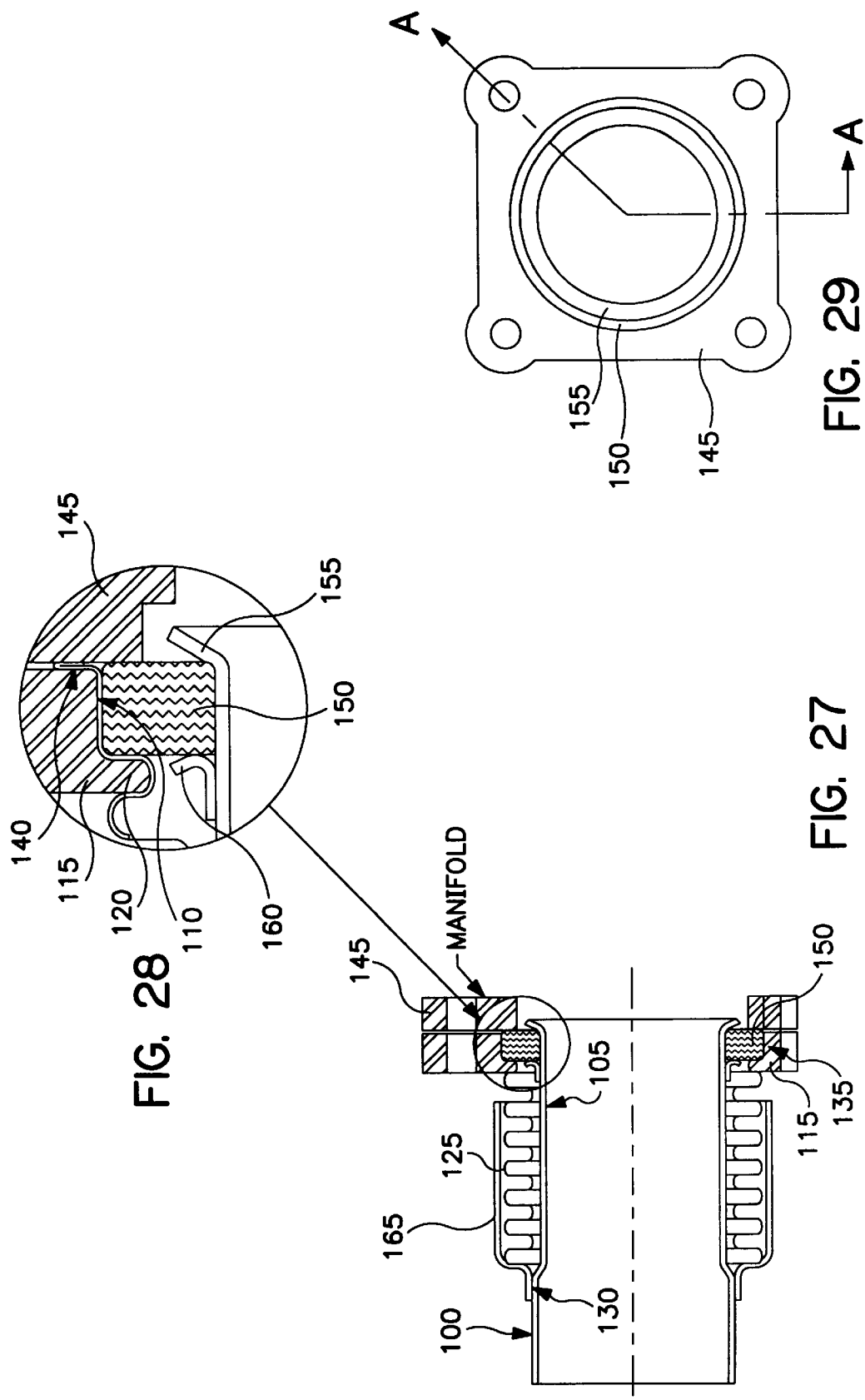

Note: The tube is manufactured into the mesh ring during mesh ring manufacturing process.

INTEGRATED FLANGE-MESH RING ASSEMBLY FOR DECOUPLER APPARATUS

This application is a continuation-in-part of application Ser. No. 08/838,601, filed Apr. 10, 1997, and presently pending.

BACKGROUND OF THE INVENTION

1. Field of the Invention

The present invention relates to connectors for joining the ends of successive lengths of pipe or conduit and/or connecting a pipe or conduit to a housing or other mounting surface wherein the connection will be exposed to axial transverse and bending vibrations. In particular, the present invention relates to connectors for joining pipes to one another or to other structures in exhaust systems for vehicles.

2. The Prior Art

It is well known that, in vehicle exhaust systems, particularly those for heavy duty vehicles, such as large trucks or earth moving equipment, the internal combustion (i.c.) engines produces significant amount of vibration in the exhaust system. Operation of the motors at continuous speeds for prolonged periods of time can, especially, produce what are known as harmonic vibrations which can cause significant deflections in extended lengths of exhaust pipe and at locations where such pipes are mounted to structures such as brackets, engine manifolds, and the like. Repeated deflections and vibration along the exhaust pipe system can, in turn, cause the structures to weaken with time and ultimately fail. Further, such harmonic vibrations can also be transmitted through the exhaust pipes to the mountings of the pipes, promoting the loosening of the mountings, which can result in the sudden displacement of one or more components of the exhaust system, with the potential for both personal injury and equipment damage.

In addition to the vibrations caused by the operation of the motor of the vehicle, an exhaust system is also subjected to various tension, compression and bending forces which also arise during the operation of the vehicle. While individual exhaust system components could be made stronger and more massive to resist failure by fatigue, such constructions would be undesirable due to weight considerations. Further, by making individual elements stiffer, the vibrations are merely transmitted throughout the exhaust system to the mountings or other components and are not reduced or eliminated. Accordingly, it is desirable to isolate the exhaust system, or at least components of the system, from such vibrations and forces.

It is known that if the pipes of an exhaust system are divided and separated by non-rigid connections, rather than being constructed as continuous extended lengths, the development of harmonic vibrations from the motor is precluded or reduced. Such non-rigid connections can be advantageously employed to absorb other tension, compression and bending forces, apart from and in addition to the motor vibration.

It is therefore desirable to provide a connector for joining a length of exhaust pipe, to another pipe or to a mounting, such as an engine manifold, which connector joins the components in a non-rigid fashion and is capable of absorbing tension, compression, and bending forces, as well as the vibrational forces, without transmitting them from one exhaust system component to another.

Typical prior art flexible connectors often require welds at both ends, in order to achieve a strong, substantially fluid-tight connection between the connector and the other exhaust system components to which they are attached. It would be desirable to avoid the use of welds whenever possible, as such welds take time to perform, adding to the installation time of the connector, and increasing the overall assembly time of the vehicle or apparatus to which they are being attached.

In addition, such welds are often difficult to place properly, often requiring additional complexity in the construction of the flexible connector, in order to provide working space for accomplishment of the weld. Still further, there is always the possibility of a small flaw in the weld, leading to possible leakage of harmful exhaust gases, and/or the introduction of a physical weakness in the structure of the flexible connector attachment, leading to the expenditure of additional time for double-checking the quality of each weld being performed.

In some instances, a weld is undesirable, and in order to provide for some form of sealing, gaskets must be positioned at the interface between the flexible connector and the exhaust manifold or other component to which the connector is being attached. Such gaskets which are usually made from mica coated stainless steel, for example, could begin to experience leakage shortly after installation, and, presuming an exhaust manifold pressure in the vicinity of 4.5 psig, could have a leakage rate of over 0.5 liters per minute.

It would be desirable to provide an alternative to welding for the manufacture and/or installation of flexible connector apparatus, which would be less expensive, require less intensive examination upon completion and/or have an enhanced degree of reliability and/or manufacturability than welding techniques.

It would be desirable to provide a flexible connector apparatus and a method and apparatus for the manufacture and installation of same, which would employ fewer welds.

It would also be desirable to provide a weldless connection between a flexible connector apparatus and a component, such as an exhaust manifold, which does not rely upon the use of gaskets, which may deteriorate with use, and which could experience leakage when in use.

These and other objects of the invention will become apparent in view of the present specification including claims, and drawings.

SUMMARY OF THE INVENTION

The present invention comprises, in part, a flexible connector apparatus for connecting first and second components of a fluid conduit system, such as an exhaust system for an internal combustion engine. The apparatus comprises a bellows member, having an axis, first and second ends, and at least two substantially uniform convolutions disposed substantially adjacent the first of the two ends; and a flange member, positioned in circumferentially surrounding relationship to the bellows member, axially between the at least two substantially uniform convolutions of the bellows member.

The flange member includes at least one attachment element, operably associated with the flange member and configured for attachment of the flange member to one of the first and second components of the fluid conduit system.

The attachment element further is configured to capture one of the at least two substantially uniform convolutions axially between the flange member and the one of the first and second components of the fluid conduit system, for forming, upon completed attachment of the flange member to the one of the first and second components, a substantially fluid-tight weldless seal between one of the at least two substantially uniform convolutions of the bellows and the adjacent end of the bellows member, and the one of the first and second components.

The axially opposite end of the bellows member is operably configured for attachment at least indirectly to the other of the first and second components, for forming a substantially fluid-tight connection therewith, toward enabling the substantially fluid-tight transportation of fluid from the one of the first and second components, through the flexible connector apparatus, to the other of the first and second components.

The flexible connector apparatus further comprises, in one embodiment, a liner tube structure insertably received within the bellows member. The liner tube structure, in turn, may comprise a first liner tube member having a radially outwardly extending annular flange at one end thereof, the first liner tube member being insertably received in the first end of the bellows member, such that at least a portion of one of the at least two substantially uniform convolutions is positioned axially between the flange member and the radially outwardly extending annular flange member, such that upon capture of the convolution between the flange member and the one of the first and second components, the radially outwardly extending annular flange member is also captured thereby; and a second liner tube member, telescopically engaged with the first liner tube member and insertably received within the bellows member, at a position distal to the first end of the bellows member, being operably configured for attachment at least indirectly to the other of the first and second components, for forming a substantially fluid-tight connection therewith, toward enabling the substantially fluid-tight transportation of fluid from the one of the first and second components, through the flexible connector apparatus, to the other of the first and second components.

A first substantially resilient spacer member is radially disposed between the telescopically engaged first and second liner tube members. Axially spaced first and second stop members, may be operably associated with the first and second liner tube members, respectively, for axially engaging the first spacer member therebetween, and limiting extensive axial movement of the first and second liner tube members relative to one another.

An end cap member may be provided, circumferentially surrounding a portion of the second end of the bellows member and a portion of the second liner tube member distal to the first liner tube member.

A second end cap member may be provided, circumferentially surrounding a portion of the first end of the bellows member and a portion of the first liner tube member distal to the second liner tube member, a portion of the second end cap member in turn being circumferentially surrounded by the flange member.

In an alternative embodiment of the invention, the bellows member is fabricated from at least two telescopically engaged tubular members, so that at least an innermost one of the tubular members overlaps others of the tubular members and, at least at the end proximate the flange member, extends axially beyond at least one other of the tubular members.

An end cap member may be provided, circumferentially surrounding a portion of the member, a portion of the end cap member in turn being circumferentially surrounded by the flange member.

In another embodiment of the invention, the convolution which is disposed between the flange member and the proximate end of the member is formed from a layer of no more than two telescopically engaged tubular members.

The present invention also comprises a method for manufacturing a flexible connector apparatus, for connecting first and second components of a fluid conduit system, such as an exhaust system for an internal combustion engine, comprising the steps of:

forming a first tubular member, having two ends;

forming a flange member, having an aperture therethrough having an inside diameter which is substantially equal to but greater than an outside diameter of the first tubular member;

configuring at least one attachment element on the flange member to enable attachment of the flange member to one of the first and second components;

inserting the first tubular member into the aperture of the flange member, to a position proximate one of the two ends of the first tubular member;

forming a plurality of at least two annular substantially uniform convolutions in the first tubular member, each such convolution having an outside diameter greater than the outside diameter of the first tubular member;

subsequent to formation of the at least two substantially uniform convolutions, the flange member being positioned between and substantially abutted by two of the at least two substantially uniform convolutions.

In one embodiment of the method, the method further comprises the steps of:

inserting a liner structure into the first tubular member after formation of the at least two substantially uniform convolutions; and mechanically connecting the liner structure to the first tubular member.

The step of inserting a liner structure further comprises the steps of:

forming an first liner tube member having a diameter which is less than the diameter of the first tubular member;

forming an second liner tube member having a diameter which is less than the diameter of the first tubular member and predominantly less than the diameter of the first liner tube member;

telescopically inserting the second liner tube member into the first liner tube member, so that a portion of the first liner tube member overlaps a portion of the second liner tube member.

The step of inserting a liner structure may further comprise the step of:

positioning at least a first substantially resilient spacer member radially between the first liner tube member and the second liner tube member.

The method may further comprise the step of:

preparing the end of the first tubular member, proximate the flange member, so that, upon attachment of the flexible connector apparatus to one of the first and second components, one of the convolutions becomes entrapped and compressed between the flange member and the one of the first and second components, to form a substantially fluid-tight seal therebetween, toward precluding escape of fluid therefrom.

Preferably, the step of inserting the first tubular member into the aperture of the flange member, to a position proximate one of the two ends of the first tubular member further comprises the step of:

inserting an end cap member over the first tubular member, a portion of the end cap member being radially enclosed by the first tubular member and the flange member.

Alternatively, the method may further comprises the steps of:

forming one or more second tubular members, having a diameter less than the diameter of the first tubular member; and inserting the one or more second tubular members into the first tubular member, so that at least the first tubular member overlaps the one or more tubular members, and at least at the end proximate the flange member, extends axially beyond at least one of the one or more tubular members.

The step of forming a plurality of at least two substantially uniform convolutions further comprises the step of:

forming the convolution which is to be disposed between the flange member and the proximate end of the member from a layer of no more than two telescopically engaged tubular members.

In a further embodiment of the invention, the invention also comprises a vibration decoupling connector apparatus, for connecting first and second components of a fluid conduit system, such as an exhaust system for an internal combustion engine. A mounting member is provided, having an aperture therethrough for the passage of fluid, the aperture having an inside surface, the mounting member being configured for attachment to a structural member in a fluid transport system. A pipe member has at least a first end region and a second end region.

A resilient flexible sealing member substantially surrounds at least a portion of the pipe member, and has two ends, a first of the two ends being operably connected to the first end region of the pipe member, a second of the two ends being operably connected to the mounting member, at least a portion of the second of the two ends of the resilient flexible sealing member being received within the aperture in the mounting member. An annular vibration damping member is radially positioned between a portion of the second end region of the pipe member, and a portion of the second end of the resilient flexible sealing member.

Means axially position the annular vibration damping member, relative to the portion of the second end region of the pipe member, the portion of the second end of the resilient flexible sealing member and the aperture of the mounting member, so that the annular vibration damping member is operably and effectively positioned within the region formed by the aperture of the mounting member.

The second end region of the pipe member is disposed in vibration absorbing contact with the vibration damping member, for enabling restricted relative axial, lateral and angular movement between the pipe member and the mounting member, when the mounting member is affixed to a structural member in a fluid transport system.

The resilient flexible sealing member is preferably positioned substantially against the inside surface of the aperture.

The means for axially positioning the annular vibration damping member comprises a first flange member, extending radially outwardly from the second end region of the pipe member; and a second flange member, extending radially outwardly from the second end region of the pipe member. The first and second flange members are axially spaced from one another, with the annular vibration damping member being axially enclosed between the first and second flange members.

The means for axially positioning the annular vibration damping member alternatively comprises a first flange member, extending radially outwardly from the second end region of the pipe member. At least a portion of the first flange member is substantially enclosed within and engaged by portions of the annular vibration damping member.

The invention further comprises means for sealing the resilient sealing member to a structural member in a fluid transport system. The means for sealing the resilient sealing member to a structural member in a fluid transport system comprises a portion of the second end of the resilient flexible sealing member, extending axially beyond the mounting member, and operably configured to be positioned axially between the mounting member and a structural member in a fluid transport system, and further operably configured to substantially circumferentially surround a fluid transport aperture in a structural member in a fluid transport system, so that when the mounting member is affixed to a structural member, a substantially fluid-tight seal is established between the second end of the resilient flexible sealing member, and the structural member.

In a preferred embodiment of the invention, wherein the bellows member has at least two annular convolutions along its length, and the means for sealing the resilient sealing member to a structural member in a fluid transport system comprises one of the at least two annular convolutions being positioned axially beyond the mounting member, so that when the mounting member is affixed to a structural member of a fluid transport system, the one of the at least two convolutions becomes captured and crushed between the mounting member and the structural member.

The annular vibration damping member preferably comprises a compressed metal mesh ring. Alternatively, the annular vibration damping member comprises a compressed ceramic mesh ring.

The invention further comprises an annular substantially rigid guard member, operably connected to the first end region of the pipe member, and substantially surrounding the resilient flexible sealing member.

The invention also comprises a method for manufacturing a vibration decoupling connector apparatus, for connecting first and second components of a fluid conduit system, such as an exhaust system for an internal combustion engine, comprising the steps of:

configuring a mounting member, with an aperture therethrough for the passage of fluid, the aperture having an inside surface, for attachment to a structural member in a fluid transport system;

substantially surrounding at least a portion of a pipe member, having at least a first end region and a second end region, with a resilient flexible sealing member with two ends;

operably connecting a first of the two ends to the first end region of the pipe member;

operably connecting a second of the two ends to the mounting member, at least a portion of the second of the two ends of the resilient flexible sealing member being received within the aperture in the mounting member;

radially positioning an annular vibration damping member a portion of the second end region of the pipe member, and a portion of the second end of the resilient flexible sealing member;

axially positioning the annular vibration damping member, relative to the portion of the second end region of the pipe member, the portion of the second end of the resilient flexible sealing member and the inner surface of the aperture of the mounting member, so that the annular vibration damping member is substantially circumferentially surrounded by the inside surface of the aperture of the mounting member, disposing the second end region of the pipe member in vibration absorbing contact with the vibration damping member, for enabling restricted relative axial, lateral and angular movement between the pipe member and the mounting member, when the mounting member is affixed to a structural member in a fluid transport system.

The method further comprises the step of positioning the resilient flexible sealing member substantially against the inside surface of the aperture.

The step of axially positioning the annular vibration damping member comprises the steps of:

extending a first flange member, radially outwardly from the second end region of the pipe member;

extending a second flange member, radially outwardly from the second end region of the pipe member, axially spacing the first and second flange members from one another, with the annular vibration damping member being axially enclosed between the first and second flange members.

The step of axially positioning the annular vibration damping member alternatively comprises the steps of:

extending a first flange member, radially outwardly from the second end region of the pipe member, substantially enclosing at least a portion of the first flange member within and engaging the portion of the first flange member by portions of the annular vibration damping member.

The method further comprises the step of:

sealing the resilient sealing member to a structural member in a fluid transport system. The step of sealing the resilient sealing member to a structural member in a fluid transport system comprises the step of:

axially extending a portion of the second end of the resilient flexible sealing member, beyond the mounting member, and operably configuring the portion of the second end of the resilient flexible sealing member to be positioned axially between the mounting member and a structural member in a fluid transport system, and further operably configuring the portion of the second end of the resilient flexible sealing member to substantially circumferentially surround a fluid transport aperture in a structural member in a fluid transport system, so that when the mounting member is affixed to a structural member, a substantially fluid-tight seal is established between the second end of the resilient flexible sealing member, and the structural member.

In the method according to this alternative embodiment of the invention, the resilient flexible sealing member comprises a bellows member having at least two annular convolutions along its length, and the step of sealing the resilient sealing member to a structural member in a fluid transport system comprises the step of:

axially positioning one of the at least two annular convolutions beyond the mounting member, so that when the mounting member is affixed to a structural member of a fluid transport system, the one of the at least two convolutions becomes captured and crushed between the mounting member and the structural member.

Preferably, in this method, the annular vibration damping member comprises a compressed metal mesh ring. Alternatively, the annular vibration damping member comprises a compressed ceramic mesh ring.

The method alternatively further comprises the step of:

operably connecting an annular substantially rigid guard member to the first end region of the pipe member, and substantially surrounding the resilient flexible sealing member with the annular substantially rigid guard member.

In a still further embodiment of the invention, a vibration decoupling connector apparatus, for connecting first and second components of a fluid conduit system, such as an exhaust system for an internal combustion engine, comprises a mounting member, having an aperture therethrough for the passage of fluid, the mounting member being configured for attachment to a structural member in a fluid transport system. A pipe member has at least a first end region and a second end region. A resilient flexible sealing member substantially surrounds at least a portion of the pipe member, and having two ends, a first of the two ends being operably connected to the first end region of the pipe member, a second of the two ends being operably connected to the mounting member. An annular vibration damping member is radially positioned between a portion of the second end region of the pipe member, and a portion of the mounting member. Means are provided for axially positioning the annular vibration damping member, relative to the portion of the second end region of the pipe member and the aperture of the mounting member, so that the annular vibration damping member is operably and effectively positioned within the region formed by the aperture of the mounting member. The second end region of the pipe member is disposed in vibration absorbing contact with the vibration damping member, for enabling restricted relative axial, lateral and angular movement between the pipe member and the mounting member, when the mounting member is affixed to a structural member in a fluid transport system.

In yet another embodiment of the invention, the second end of the resilient sealing member extends at least partially into the aperture of the mounting member.

BRIEF DESCRIPTION OF THE DRAWINGS

FIGS. 12–15 are schematic illustrations of steps in the process of assembling the inlet and outlet tubes for a flexible connector apparatus according to the embodiment of FIG. 1 of the present invention.

FIG. 18a is a side elevation, in partial section, of a flexible connector apparatus, according to another embodiment of the invention, prior to assembly to an exhaust manifold.

FIG. 18b is an end elevation of a flange member suitable for use with a flexible connector apparatus of the embodiment of FIG. 18a.

FIG. 27 is a side elevation, in section, of a vibration decoupler apparatus according to an alternative embodiment of the invention.

FIG. 28 is an enlarged view of a portion of the vibration decoupler apparatus according to the embodiment of FIG. 27.

FIG. 29 is an end elevation of the vibration decoupler apparatus of FIG. 27.

DETAILED DESCRIPTION OF THE DRAWINGS

Figure 2:
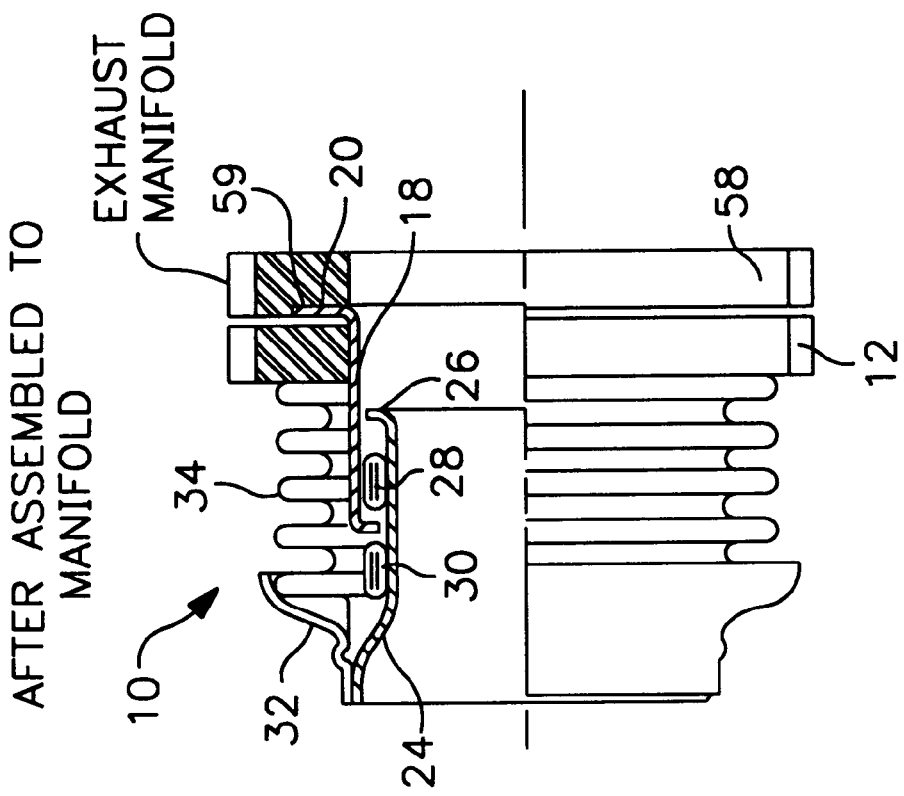
FIG. 2 is a side elevation, in partial section, of a flexible connector apparatus, according to one embodiment of the invention, subsequent to assembly to an exhaust manifold.

While this invention is susceptible of embodiment in many different forms, there is shown herein in the drawings and will be described in detail several specific embodiments, with the understanding that the present disclosure is to be considered as an exemplification of the principles of the invention and is not intended to limit the invention to the embodiments illustrated.

Figure 1:
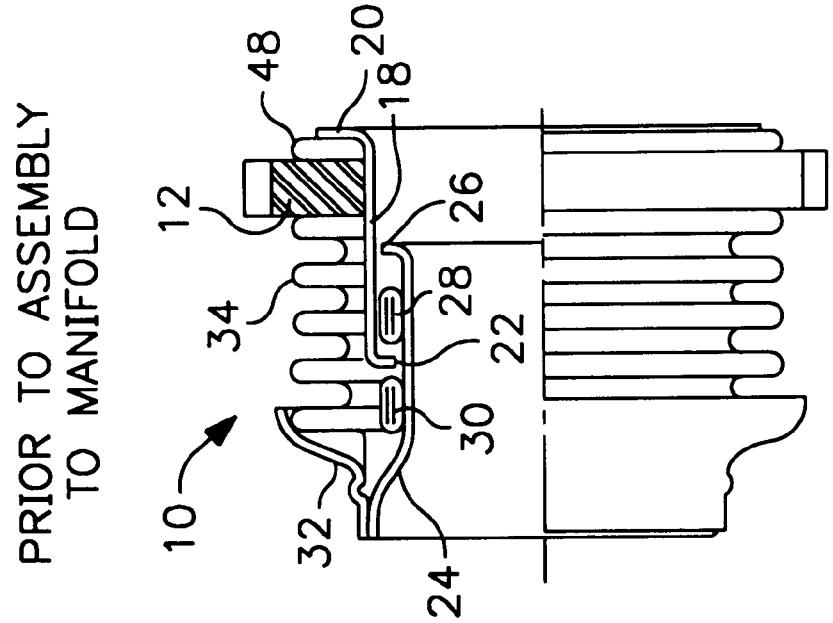
FIG. 1 is a side elevation, in partial section, of a flexible connector apparatus, according to one embodiment of the invention, prior to assembly to an exhaust manifold.
Figures 3, 4:
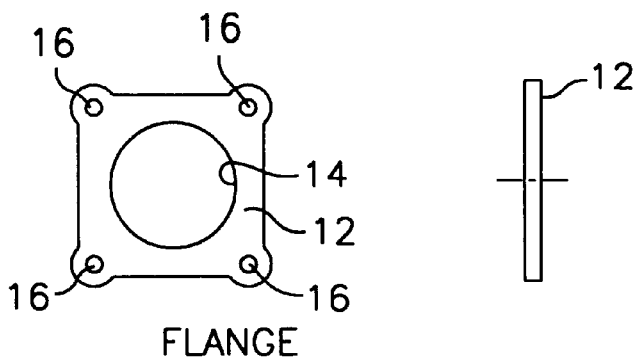
FIG. 3 is an end elevation of a flange member suitable for use as a component of any of the embodiments of the flexible connector apparatus of the present invention.
FIG. 4 is a side elevation of the flange member of FIG. 3.
Figure 5:
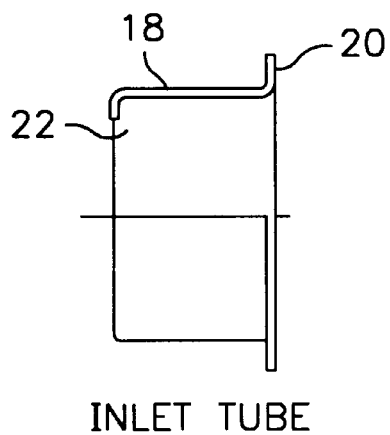
FIG. 5 is a side elevation, in partial section, of an inlet tube of a flexible connector apparatus according to the embodiment of FIG. 1 of the present invention.
Figure 6:
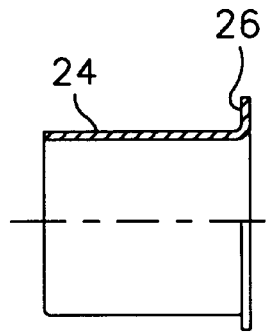
FIG. 6 is a side elevation, in partial section, of an outlet tube of a flexible connector apparatus according to the embodiment of FIG. 1 of the present invention.
Figure 7:
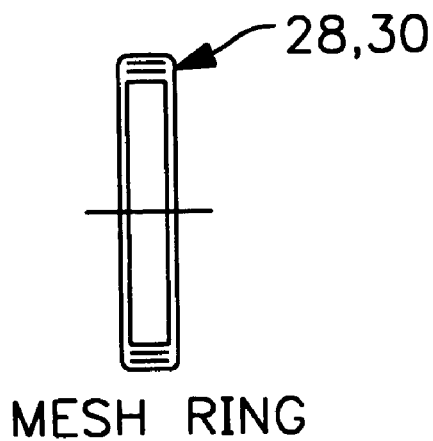
FIG. 7 is a side elevation, in section, of a mesh ring of a flexible connector apparatus according to the embodiment of FIG. 1 of the present invention.
Figure 8:
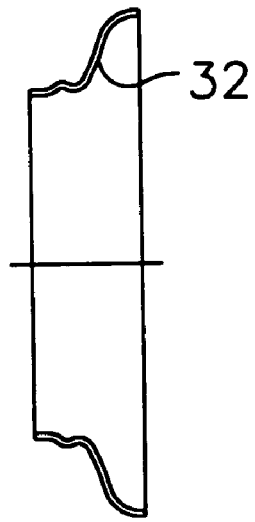
FIG. 8 is a side elevation, in section, of an end cap of a flexible connector apparatus according to the embodiment of FIG. 1 of the present invention.

FIGS. 1 and 2 illustrate flexible connector 10 according to one embodiment of the invention. Several of the components which make up flexible connector 10, are also shown individually in FIGS. 3–8, and include flange member 12 (having central aperture 14 and bolt holes 16), inlet tube 18 (having outwardly turned flange 20 and inwardly turned bead 22), outlet tube 24 having outwardly turned bead 26, mesh rings 28 and 30, end cap 32, and bellows 34. Mesh rings 28, 30 may be formed from compressed steel mesh, ceramic wool, or the like, according to known techniques, and may even be impregnated with materials such as graphite, vermiculite and/or other friction-reducing material. In a preferred embodiment of the invention, mesh rings 28 and 30 are substantially identical.

Depending upon the requirements of the particular installation application, the flange may have a different shape, other than generally rectangular, and/or may have fewer bolt holes. In addition, while mesh ring 28 will be present in typically all applications, in some embodiments mesh ring 30 may not be employed.

Figure 9:
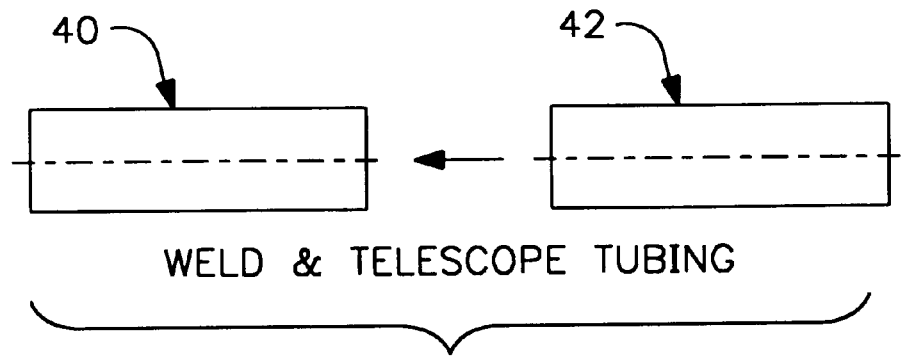
FIGS. 9–11 are schematic illustrations of steps in the process of forming a bellows for a flexible connector apparatus according to the embodiment of FIG. 1 of the present invention.
Figure 10:
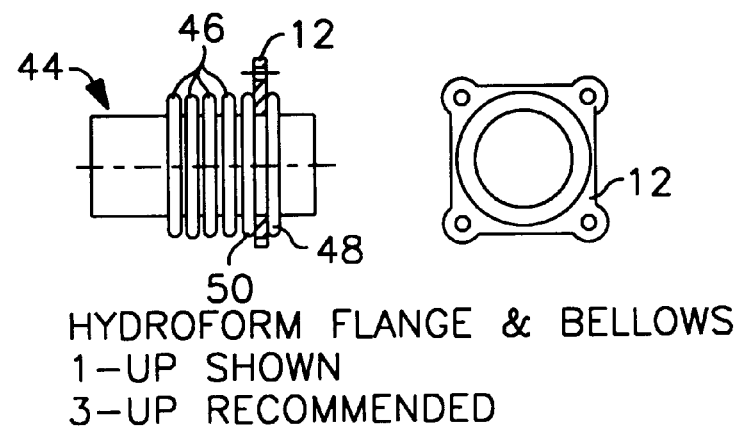
Figure 11:
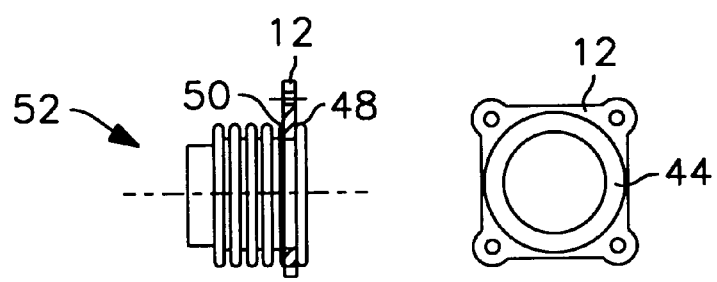

Bellows 34 is preferably formed according to the process illustrated in FIGS. 9–11. A piece of sheet metal material is rolled into a cylindrical tube 40 and welded. According to the requirements of the particular installation application, a second sheet of material may be formed into a tube 42 having a slightly greater or lesser diameter and then telescopically inserted into or fitted around tube 40 to form a composite tube 44. Additional, smaller diameter tubes may be successively inserted, as well. If a number of layers are desired for the bellows tube, as an alternative to using plural telescoping tubes, the bellows tube may be formed as a spiral coil, having a number of turns. Other methods of providing multiple tube layers may also be used.

The composite tube 44 is then hydroformed, according to otherwise known techniques, to produce substantially uniform convolutions 46, and total bellows structure 34. In typical hydroforming of a bellows, a piece of tube (actually two or more telescopically arranged tubes) are placed into a hydroforming device, and plugged at their ends. A typical hydroforming apparatus has a plurality of blades, set in pairs, which pivot together like a set of jaws. In other hydroforming apparatus, the pairs of blades are arranged to close together in a non-pivoting linear (e.g., vertical or horizontal) motion, like the components of a press. Each blade of each pair will have a semicircular cutout, so that when a pair of blades is closed around the tube, the cutouts form an aperture which will have a diameter slightly greater than the initial greatest outside diameter of the unformed tube. After the several pairs of blades have closed around the tube, and been clamped into place, a substantially incompressible fluid material, such as water is inletted into the tube. Slight axial pressure may be exerted on the ends of the tube, after the ends have been plugged, or extra water pressure may be exerted on an inlet end, prior to sealing. Since the water is essentially incompressible, the tube yields, bulging in the locations between the spaced apart pairs of blades.

The pairs of blades are all interconnected and configured for axial movement, in pairs. For example, the axially outermost blade pairs can be moved, such as by a hydraulic cylinder, toward one end of the tube. The movement of the various blade pairs is coordinated, so that the reduction in the length of the spaces between the blade pairs is accomplished in a uniform manner. Movement of the blades begins after the tube has been "bulged" after introduction of the water. The blades "grab" the tube bulges, forcing the bulges to become radially larger and axially shorter, growing into the evenly spaced convolutions seen in the finished product.

However, in prior art bellows hydroforming procedures and prior art bellows constructions, a simple sequence of uniform convolutions is formed. In the present invention, at a selected location on the composite tube, which would be otherwise between the last convolution 48 at one end and the penultimate convolution 50 adjacent to the last convolution 48, a flange member 12 is fitted over composite tube 44, prior to the hydroforming step, to form bellows 34 and composite bellows/flange member structure 52. In order to accommodate the flange member during the hydroforming step, one pair of blades, which would otherwise form the indentation between the last and penultimate convolutions, is omitted or shifted aside.

During the hydroforming step, the portion of composite tube 44, which is encircled by flange member 12 will conform to fit against the inner surface of aperture 14.

The process of hydroforming is illustrated in a highly schematic manner in FIGS. 21–26.

Figure 21:
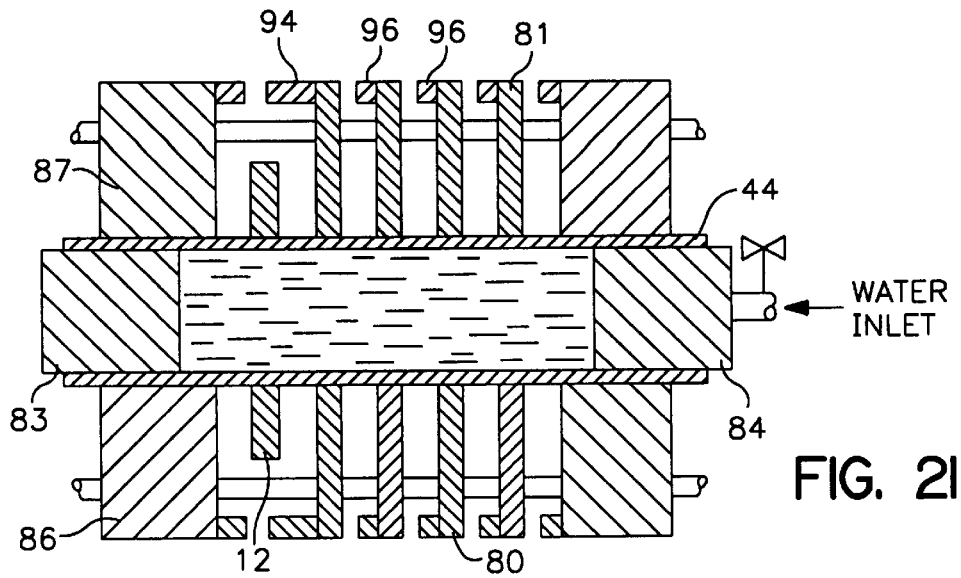
FIG. 21 is a sectional view of an apparatus for forming the convolutions in a tube, which has a flange member fitted thereon.
Figure 22:
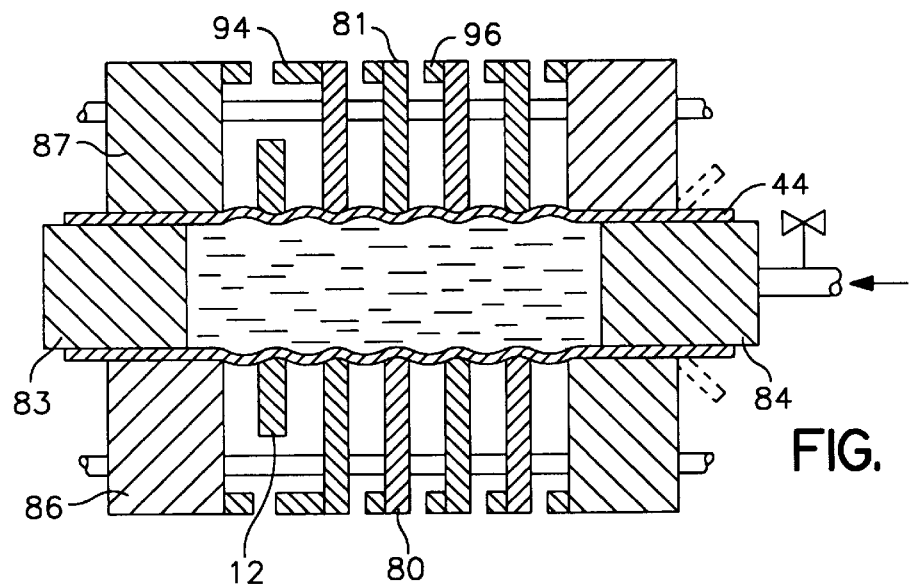
FIG. 22 is a sectional view of the apparatus of FIG. 21, after pressure has been applied to the water within the tube to be formed.
Figure 23:
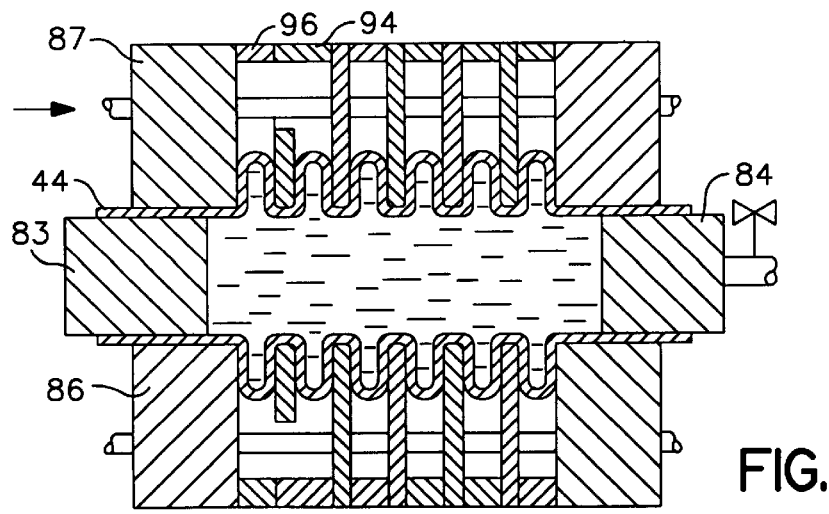
FIG. 23 is a sectional view of the apparatus of FIGS. 21–22, when the blade pairs are moved so as to enlarge the bulges into convolutions.

FIGS. 21–23 show an apparatus for forming a single bellows tube/flange member combination. Tube 44, with flange member 12 is inserted into the device, the pairs of blades 80, 81 are closed, nose pieces 83, 84 are inserted into the ends of tube 44, and sealed so that no water can escape from between either of nose pieces 83, 84, and the tube. Some form of position holding device, such as a spacer member (not shown), will position the flange during the convolution formation process. Tube 44 is then filled with water through one of the nose pieces, e.g. nose piece 84. As pressure is applied to the column of water in the tube, the blades constrain portions of the tube. The unconstrained portions of the tube 44 bulge radially outwardly, slightly.

The blade pairs 80, 81 and the end block pairs 86, 87 are then moved, in a coordinated manner, to "squeeze" the bulges. One of nose pieces 83, 84 is moved (see arrow, FIG. 23), to follow the corresponding end of the contracting tube 44, and the convolutions are formed. The ends of tube 44 which project beyond blocks 86, 87, are affixed, to prevent the ends of tube 44 from being pulled in toward the center of the apparatus, as the blade pairs are moved. One method of affixing the ends 44 would be to swage the ends to create flares which will axially fix the ends (see dotted line in FIG. 22).

Spacers 94, 96 are provided on the blades and on the blocks, respectively, so that as axial pressure is placed, for example from the left to the right on the end block, the convolutions begin to form. Since the blade pairs will move varying distances, those on the right, will have the least distance to move, and the corresponding convolutions will form first, although all the convolutions will be formed during the single hydroforming process. Since the final spacing of the blades is more or less uniform, as defined by the spacers, the final convolutions will be more or less uniform, including those on both sides of the flange.

Figure 24:
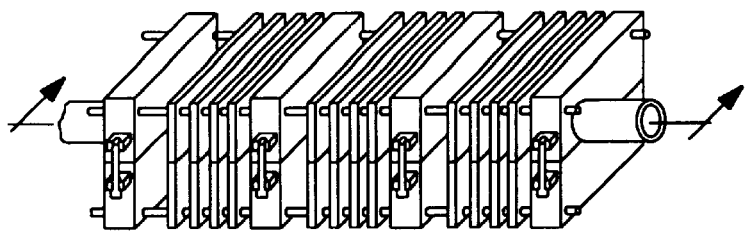
FIG. 24 is a perspective view of a modified convolution forming apparatus, configured for forming a plurality of bellows/flange member units at one time, which are then separated by severing of their common tube.
Figure 25:
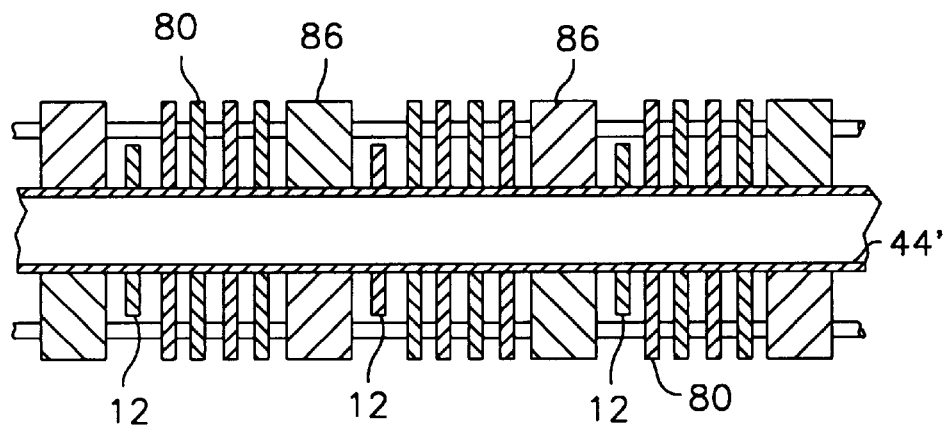
FIG. 25 is a side elevation, in section, of the apparatus of FIG. 24.

FIGS. 24, 25 illustrate an alternative construction of the convolution forming device, in which several (e.g., 3) bellows tube/flange member units are formed, using a common tube. After forming of the convolutions, and removal of the formed tube from the device, the tube is cut into three separate sections, typically at the locations where the necks are formed by blocks 86. The spacers are omitted for clarity of illustration.

Figure 26:
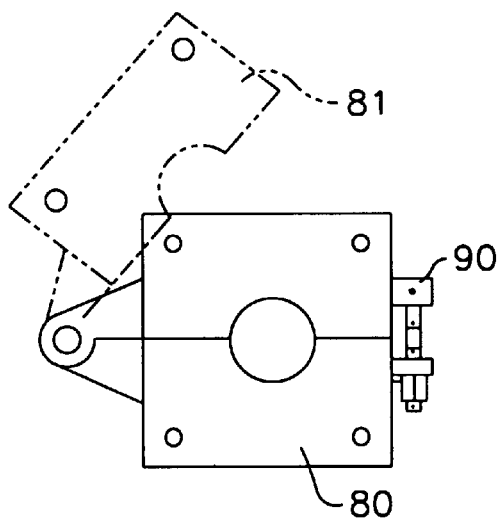
FIG. 26 is an end elevation of a convolution forming apparatus according to any of FIGS. 21–25, showing the pivoting action of the blades in unison, relative to one another.

FIG. 26 illustrates the relative pivoting of the separate units of the blade and block pairs. When the pairs are closed, a latch or clamp 90 is used to hold the pairs in closed position, against the pressure exerted by the tube as a result of the water pressure.

While one general type of hydroforming is shown schematically and described herein, other forming techniques may be used. However, the general process described has the advantage of more or less simultaneously forming substantially uniform convolutions on either side of a flange in a single manufacturing step, enhancing the manufacturability and reducing the cost of the overall component.

After the hydroformed bellows/flange member structure 52 is removed from the hydroforming machine, bellows/flange member structure 52 will typically undergo various adjustments and finishing processes, in order to prepare the structure 52 for installation.

The remaining neck of composite tube 44 (which usually has a length of about 0.625 inches) may be further processed, in one of the following methods, among others: a) complete removal from convolution 48; b) trimming to a length of about 0.030 inches, which might typically be crushed down during the process of attachment to the manifold; and c) rolling radially inwardly and around and back into the bellows. Excess neck is then trimmed from the opposite end of composite tube 44.

Inlet tube 18, outlet tube 24, and mesh rings 28, 30 are assembled according to the procedure shown in FIGS. 12–15. First, mesh ring 28 is inserted into inlet tube 18, and fitted against bead 22. Preferably, the outer diameter of mesh ring 28 is such that there is a slightly forced fit between mesh ring 28 and the inner surface of inlet tube 18. Next, outlet tube 24 is inserted into inlet tube 18 (from the right to left, the direction of the arrow, as seen in FIG. 13). Mesh ring 28 thereby becomes axially enclosed by beads 22 and 26.

Optional mesh ring 30 may then be fitted onto outlet tube 24, again, preferably with a slightly forced fit, until it abuts bead 22. Then, the portion of outlet tube 24, which is downstream of mesh ring 30, is typically expanded outwardly, such as by swaging, to an increased diameter, as shown in FIGS. 1, 2 and 15. The assembled components form liner tube structure 54.

Figure 17:
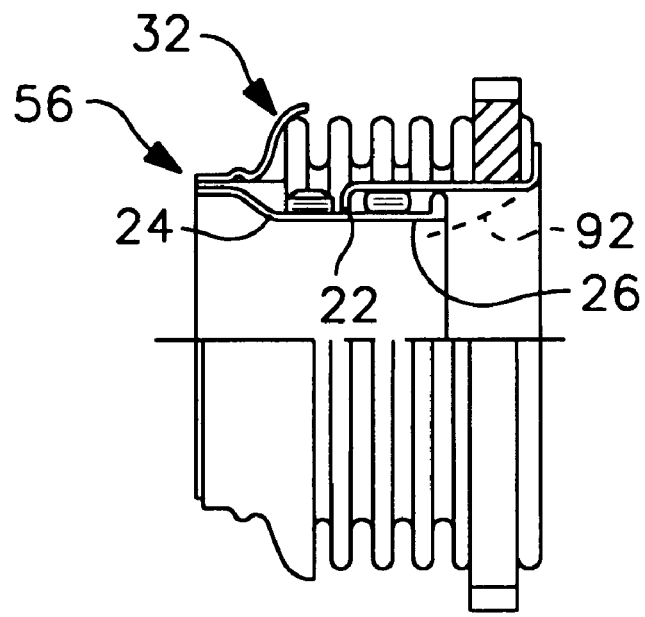

In order to improve the fluid dynamics and reduce possible noise which may be created at the leading edge of outlet tube 24, the liner tube structure 24 may be provided with a shroud 92, shown in phantom in FIG. 17, which would extend radially inwardly from the inner surface of inlet tube 18, to help smooth the flow of fluid through the flexible connector.

Figure 16:
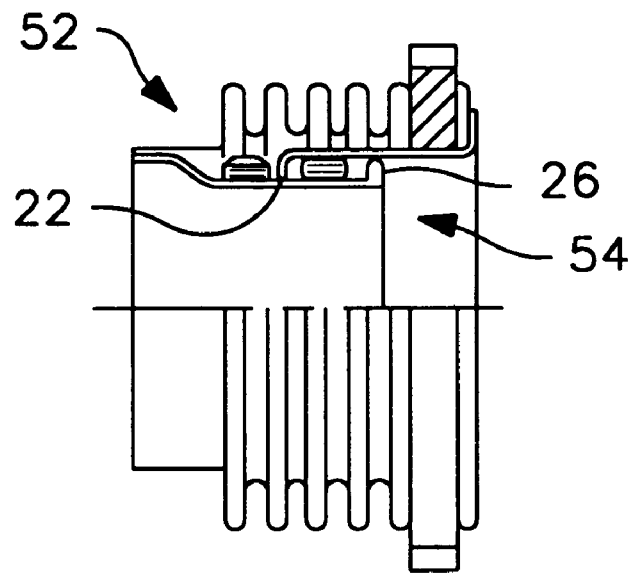
FIGS. 16–17 are schematic illustrations of steps in the process of assembling the bellows/flange member structure to the assembled inlet and outlet tubes for a flexible connector apparatus according to the embodiment of FIG. 1 of the present invention.

The final assembly of bellows/flange member structure 52 and liner tube structure 54, to form flexible connector 10, prior to its subsequent installation to another component, such as an exhaust manifold, is shown in FIGS. 16–17. Liner tube structure 54, comprising inlet tube 18, outlet tube 24, and mesh rings 28, 30, is inserted into bellows/flange member structure 52. Thereafter, end cap 32 is fitted onto the free end of the bellows/flange member structure 52, and forcibly sized radially onto the overlapping bellows 34 and outlet tube 24, to form a snug mechanical connection between outlet tube 24 and the bellows 34, at 56. One function of end cap 32 is to provide some protection to bellows 34 against externally directed abrasion or moving objects, which could damage or even puncture the bellows.

Although a two-piece (inlet tube/outlet tube) liner is shown in the embodiment of FIGS. 1–17, other kinds of liner structure, within the bellows tube, can be employed, if desired. Other examples include, but are not limited to, a three-piece liner (two end tubes connected by a third outer or inner tube overlapping or overlapped by the two end tubes), a single piece of straight tube, a metal wire braided sleeve (often used for acoustic purposes and/or to limit the amount of extension of the bellows), or a spiral wound tube, all of which separately are known in the art. Since these other kinds of liner structures are inserted after formation of the bellows/flange structure, the assembly after formation of the liner, is substantially the same as previously described.

In addition, the beads 22, 24, which are shown to be 90° turns of the ends of the liner tubes, may be substituted with flanges turned a greater or lesser amount, for example in the range from 45° to a full 180° turn, or with annular rings welded onto the ends of the liner tubes or the like, or omitted altogether.

Alternative embodiments may have a flange at both ends of the bellows structure. This may readily be accomplished by placement of flanges near opposite ends of the unformed bellows tube, and formation of the convolutions in the manner discussed previously, using a suitably configured convolution formation set-up, followed by insertion of a liner structure according to the needs of the particular application.

FIG. 2 illustrates the final assembly procedure, during which the flexible connector apparatus 10 is affixed to another exhaust vehicle component, in this case, an exhaust manifold 58. Annular depression 59, which will have a depth which preferably will be approximately the same as or slightly less than the thickness of flange 20 and which will have a diameter which will be at least as great as or slightly larger than that of flange 20, will be formed into exhaust manifold 58, either as part of the original manufacturing process for manifold 58, or as a later machining step. Flexible connector apparatus 10 is affixed, such as by bolts (not shown) through bolt holes 16 which will mate with corresponding blind bolt holes (not shown) in exhaust manifold 58. Other forms of fastening may be employed, if desired.

Alternatively, depression 59 could be placed in the opposing face of flange 12. In that case, it is important that the diameter of the depression 59 is less than the diameter of convolution 48, so that the seal can be formed.

As the bolts are tightened down, for example, to the degree of tightness which would be used in prior art coupler installations using gaskets, convolution 48 will become substantially completely flattened between exhaust manifold 58 and flange member 12, until seals are formed between flattened convolution 48 and exhaust manifold 58, and between flange member 12 and flattened convolution 48 of bellows 34, respectively, which are substantially more effective in terms of fluid tightness, and more simply obtained than prior art connector constructions, all without the need for a separate gasket component. At the opposite end of flexible connector apparatus 10, if a fluid tight connection has been formed between bellows 34 and outlet tube 24 by the sizing of end cap 32, then outlet tube 24 is simply connected, typically by a simple weld or braze, to the downstream exhaust system component (not shown). If no fluid tight seal has been formed between outlet tube 24 and bellows 34, then such a seal is formed at the time of connection to the downstream exhaust system component, using conventional assembly techniques.

If desired, the last convolution on apparatus 10 may be precompressed, prior to mounting to the exhaust manifold or other component to which it is being attached.

The embodiment of FIGS. 1–17 is shown having a liner tube structure, in which the inlet tube 18 has a greater diameter than, and insertably receives, outlet tube 24. It is understood that, if desired by the requirements of the particular installation application, the relative orientations could be reversed, while still being within the scope of the present invention. That is, the inlet tube could be provided with a lesser diameter, and be insertably received within, the outlet tube, with the inlet tube still being provided with a flange 20, as in the illustrated embodiments.

In addition, it is to be understood that the entire apparatus 10, which, as shown in FIGS. 1–17 is intended to be connected, for example, to an exhaust manifold, in which the flow of fluid is from right to left (in FIG. 2), could be installed in the reversed orientation, for example, to the inlet of a muffler, in which case, the inlet tube would actually be the outlet, and the flow through the apparatus would be from left to right, as the apparatus is seen in FIG. 2.

The flexible connector apparatus of the present invention provides a substantially fluid-tight seal at the interface between the bellows and the exhaust manifold, without the need for a weld or braze. In addition, such a connection can be made, if desired, without the need for a packing or seal positioned between the bellows and any clamping device, such as the flange member, and the surface of the exhaust manifold to which the flexible connector is being attached. This enables the connection to the exhaust manifold to be accomplished more quickly, more simply, and less expensively, than in prior art flexible connector constructions.

In addition, in prior art flexible connector constructions, instead of a radially extending flange at the end of the inlet tube, only a neck typically would be provided which would have to have a substantial thickness, in order to accommodate the weld or braze which would typically be used to connect the tube to the flange. Usually the welding process would result in warping of the flange, which, in turn, would require the use of a gasket, to enhance the sealing of the connection. The present invention permits the inlet tube end and flange to be much smaller and thinner, since the material no longer has to be sized to accommodate a weld. The invention also obviates the need for a sealing gasket.

In the embodiment of FIGS. 1–17, the inlet and outlet tubes, are liner tubes, serving to thermally insulate the bellows from the exhaust gases. The inlet and outlet liner tubes also serve to isolate the bellows chemically from the corrosive exhaust gases. The inlet and outlet tubes, and mesh members, in cooperation with the bellows, accommodates axial extension and compression of the flexible connector apparatus, resulting from relative movement of the exhaust manifold (or other upstream component) and the downstream component (such as a tailpipe structure). The mesh members serve to provide resilient absorption of shock and vibration which might otherwise occur during overcompression and over-extension of the connector apparatus. In addition, the mesh rings aid in dampening and decoupling lateral vibrations in the exhaust system. In addition, the inlet and outlet tubes and the spacer radially in between, provide support for the flexible connector structure.

In some applications, it may be desirable to provide a flexible connector construction, which is substantially self-supporting, as that term is understood by those of ordinary skill in the art (i.e., no additional support for the connector for some stated number of tube diameters' distance from the connection to the exhaust manifold), but which eliminates the need for the inlet and outlet tubes, which, while adding to the strength and load-carrying capacity of the flexible connector apparatus, simultaneously add to the flexible connector apparatus' weight, cost and complexity. Such structure may not be desirable or particularly advantageous in situations where weight or cost are critical or where available installation space is at a premium.

Such an alternative flexible connector apparatus 60 of the invention is shown in FIGS. 18a and 18b. The inlet and outlet tubes, and the mesh rings are omitted. Bellows 62 is preferably formed from a plurality (2 or more, 3, preferably) of layers of tube material, which may be telescoped, closely fitted tubes, or if a number of layers are desired for the bellows tube, as an alternative to using plural telescoping tubes, the bellows tube may be formed as a spiral coil, having a number of turns. Other methods of providing multiple tube layers may also be used. A tube having a single thick layer could be used if desired in some applications. The formation of the bellows, with the flange member 64, axially enclosed by convolutions 66 and 68, is accomplished by hydroforming techniques, substantially the same as those employed with respect to the embodiment of FIGS. 1–17, in that flange member 64 is slipped onto the unformed tubes, prior to formation of at least the endmost convolution 68.

Not all of the "plies" of tubes forming the bellows 62 will be coextensive. While all of the plies may have aligned ends at the "downstream" end of flexible connector apparatus 60 (as illustrated), at the upstream end (i.e., adjacent the flange member location), the end(s) of the radially innermost tube or tubes stop to form a cylindrical neck 72, which is surrounded by the flange member 64. The innermost ply or tube 70 (or possibly the two innermost plies or tubes) proceed(s) upstream to form convolution 68. That is, the end convolution adjacent the flange will be made from, typically, one (or more) fewer plies than the remaining convolutions, and the plies which make up the end convolution will be the innermost one or two plies (although in the instance of a tube having more than three plies, the numbers of plies which are shortened and the number which make up the last convolution may be varied). The reduction in the number of plies permits a strong bellows-only connector structure to be created, but still permits the flattening of the last convolution to provide the sealing between the flange, the convolution and the component to which the coupling is being attached.

While it is preferred that at least the innermost ply form the endmost convolution, the other plies if any of the endmost convolution preferably are the next adjacent plies, though others may be used.

The mounting of flexible connector apparatus 60 to an exhaust manifold (such as manifold 58 from the previous embodiment, minus the annular depression 59) is similarly accomplished by bolting down flange member 64 to an exhaust manifold or other structure having bolt holes alignable with bolt holes 63 of flange member 64, and an aperture alignable with central aperture 65, of flange member 64.

The multi-ply bellows 62 of the flexible connector apparatus of FIG. 18a and 18b provides accommodation of extension, compression, and lateral movements, with a substantially self-supporting feature arising from the increased stiffening of the bellows structure, all without the additional cost, complexity and weight of the inlet and outlet tube liner structure of the prior embodiment.

Although not specifically illustrated, it is understood that the embodiment of FIGS. 1–17 can also be constructed having a bellows fabricated from more than two telescoped tubes, and having an end construction, in which the end convolution adjacent the flange has fewer plies than the remaining convolutions.

Figure 19:
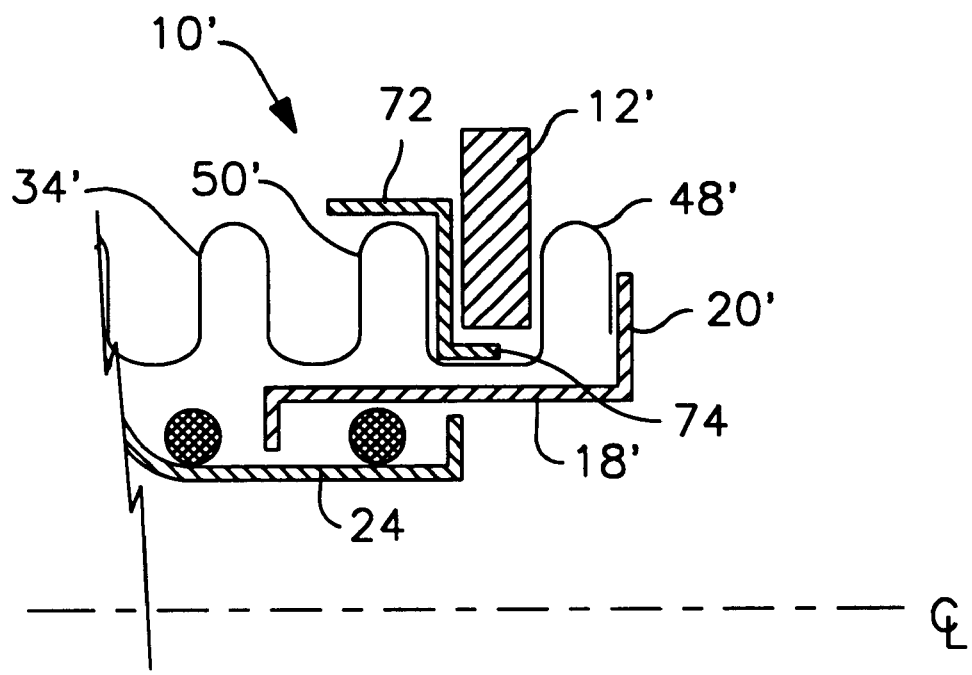
FIG. 19 is a fragmentary side elevation, in section, of a flexible connector apparatus, according to still another embodiment of the invention.

FIG. 19 shows another alternative embodiment of the invention, which is substantially similar to the embodiment of FIGS. 1–17, and wherein elements having functions and structures similar to that of like elements in the first embodiment are provided with like reference numerals, augmented by a prime ('). As it is understood that the apparatus of FIG. 19 is symmetrical about a central axis designated $C_L$, only the "upper" half of the flexible connector apparatus 10' is shown, in section.

Apparatus 10' is substantially identical to apparatus 10, both in structure, and in method of fabrication, except that an upstream end cap 72 is provided, for giving some protection to the exterior of bellows 34'. A cylindrical portion 74 of end cap 72 is captured between flange member 12' and bellows 34', when the convolutions 48' and 50' of bellows 34' are formed by the previously described hydroforming process. Typically the lesser diameter "neck" of end cap 72 will have an axial length which is less than the thickness of flange member 12', so that it will not extend entirely to convolution 48'. Once end cap 72 has been positioned, and bellows 34' formed, the remainder of the formation and assembly process for flexible connector apparatus 10' is the same as described with respect to apparatus 10. End cap 72 provides protection for the bellows, and also provides lateral support for the bellows itself, as described in further detail with respect to the following embodiment.

Figure 20:
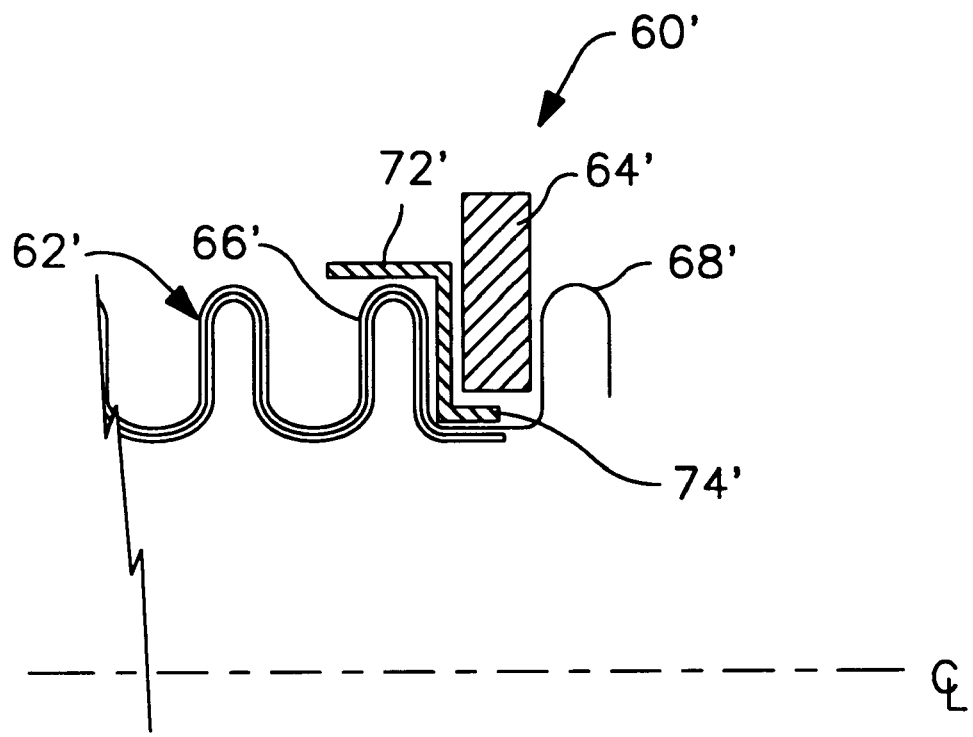
FIG. 20 is a fragmentary side elevation, in section, of a flexible connector apparatus, according to still yet another embodiment of the invention.

FIG. 20 shows another alternative embodiment of the invention, which is substantially similar to the embodiment of FIG. 18a and 18b, and wherein elements having functions and structures similar to that of like elements in the first embodiment are provide with like reference numerals, augmented by a prime ('). As it is understood that the apparatus of FIG. 20 is symmetrical about a central axis designated $C_L$, only the "upper" half of the flexible connector apparatus 60' is shown, in section.

Apparatus 60' is substantially identical to apparatus 60, both in structure, and in method of fabrication, except that an upstream end cap 72' is provided, for giving some protection to the exterior of bellows 62'. A cylindrical portion 74' of end cap 72' is captured between flange member 64' and bellows 62', when the convolutions 66' and 68' of bellows 62' are formed by the previously described hydroforming process. Typically, the neck portion of end cap 72' will have an axial length which is less than the thickness of flange member 64', so that it will not extend entirely to convolution 68'. Once end cap 72' has been positioned, and bellows 62' formed, the remainder of the formation and assembly process for flexible connector apparatus 60' is the same as described with respect to apparatus 60.

End cap 72', as discussed with respect to the other embodiments, provides external protection for the bellows convolutions in the vicinity of the ends of the bellows. In addition, and particularly with respect to the bellows-only embodiment, the end cap(s) provide lateral support for the flexible connector apparatus. Especially in the bellows-only embodiment, the portion of the bellows (particularly the smaller diameter portion or "core") nearest the ends can become exposed to substantial bending forces, which could lead to over-bending of the bellows, leading in turn to permanent excessive deformation and/or fatigue failure from repeated extreme bending. Accordingly, the end cap provides a limit to the amount of bending that the bellows can undergo.

In some embodiments, the diameter of the convolutions and the shape of the end caps will be established so that upon installation, the bellows will have a compressive preload, so that endmost convolutions will be prompted into contact, at locations not at the greatest diameter, to the inner surface of the end caps, to provide further support for the flexible connector apparatus. In addition, the preloading of the bellows convolution against the end cap(s) prevents "buzzing" or rattling which might otherwise occur, during operation of the machine to which the flexible connector apparatus is attached.

In alternative embodiments of the invention, a braided metal sleeve, such as are known in the art, may be substituted for or used in addition to the end cap(s) 72, 72'. The placement of such a metal braid would occur after the formation of the convolutions, including those surrounding the flange.

In a further alternative embodiment of the invention (FIGS. 27–29), pipe 100 has a narrowed inlet end 105 which has an outer diameter which is less than the inner diameter of aperture 110 of flange plate 115. The inner surface of aperture 110 has an L-shaped configuration, with a larger diameter portion and a radially inwardly extending lip 120. A bellows 125 is affixed at a downstream end 130 to pipe 100. The upstream end 135 of bellows 125 is swaged radially outwardly to conform to the inner surface of aperture 110. In a preferred embodiment of the invention, the bellows 125 is formed, such as by hydroforming, to be integral with flange plate 115, in a manner similar to that described with the prior embodiments. Instead of the flange plate having a simple cylindrical aperture, the aperture has an L-shaped cross-sectional contour, as illustrated. In this way, the bellows will conform closely to the inside surface of the aperture.

As shown in greater detail in FIG. 28, end 135 of bellows 125 closely conforms to lip 120. At the extreme tip of end 135, a final convolution 140 is provided which is axially flattened, when flange plate 115 is bolted down against manifold 145, to provide a substantially gas-tight seal between manifold 145 and flange plate 115, without requiring welding or the use of a gasket, such as are known in the art.

A mesh ring 150, which may be metal or ceramic mesh, the composition and physical structure of which may be otherwise conventional, is positioned radially between the end 135 of bellows 125 and the outer surface of pipe end 105. An outward turning 155, and an annular flange 160, which may be welded or otherwise affixed to pipe end 105 axially station mesh ring 150. As an alternative to affixing a separate piece of material to pipe end 105, to form flange 160, a radially outwardly projecting bump or ridge (not shown) may be provided. As a further alternative, a circumferentially extending, radial contraction or pocket may be formed in pipe end 105, which may serve to axially restrain the mesh ring. In addition, lip 120 also serves to preclude axial movement of the mesh ring. A shroud 165, which preferably will be a substantially rigid metallic structure, may be provided, attached to pipe 100 over the downstream end of bellows 125, to protect bellows 125.

Depending upon the preloading which is to be imposed upon the connector, in actual installation, the construction may vary slightly. For example, if the connector is always to be in compression (though in varying degrees), then outward turning 155 may not be necessary and may be omitted. Conversely, if the connector is always going to be in tension (though in varying degrees), then flange 160 may not be necessary and may be omitted. If the connector will have a neutral resting configuration, or one which is slightly compressed, but may cross into tension, then the configuration of FIGS. 27–29 will be preferred.

Figure 31:
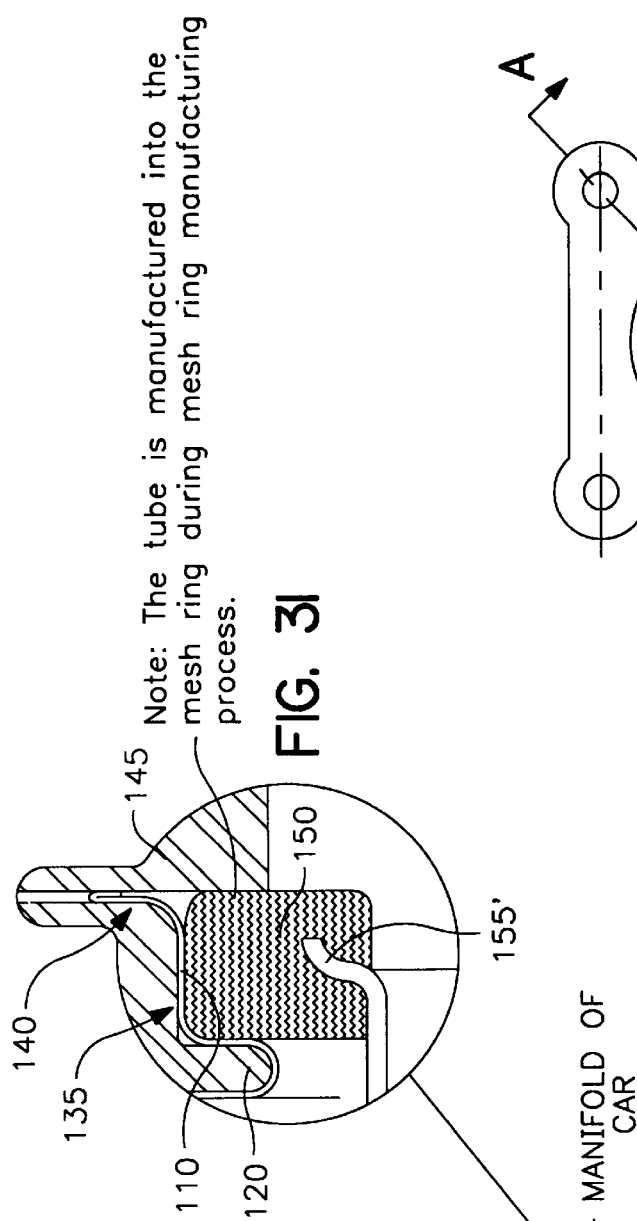
FIG. 31 is an enlarged view of a portion of the vibration decoupler apparatus according to the embodiment of FIG. 30.
Figure 32:
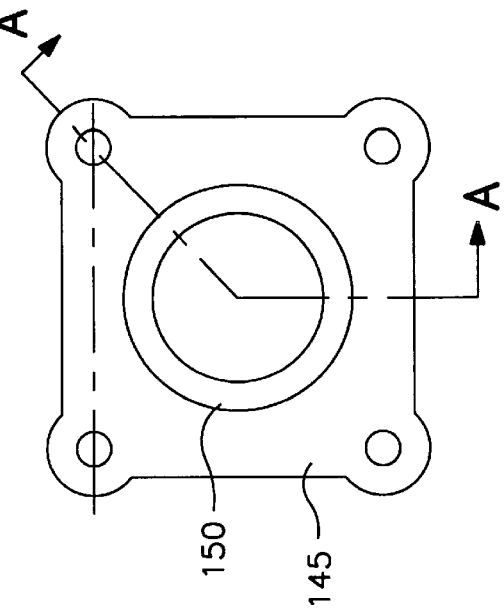
FIG. 32 is an end elevation of the vibration decoupler apparatus of FIG. 30.
Figure 30:
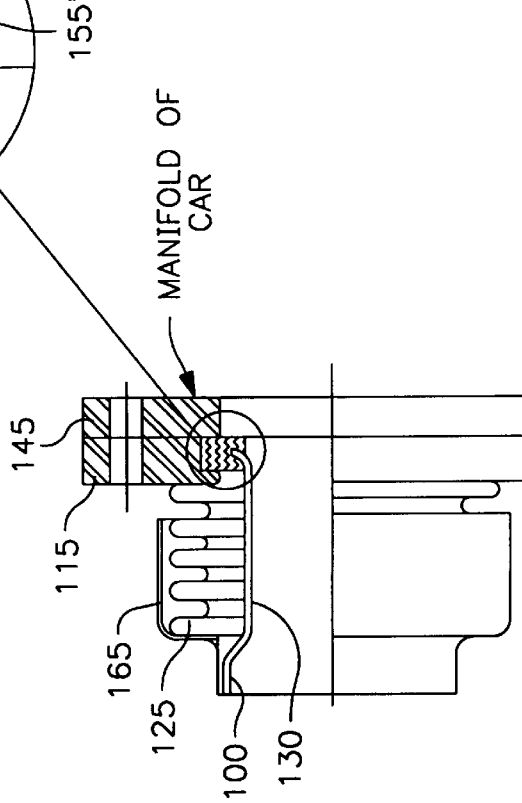
FIG. 30 is a side elevation, in section, of a vibration decoupler apparatus according to another alternative embodiment of the invention.

In an alternative embodiment of the invention, instead of providing flange 160, and bracketing mesh ring 150, the turning 155' is provided. See FIGS. 30–32. The pipe end 105 is manufactured into the mesh ring during the mesh ring manufacturing process. Specifically, prior to the final compression of the mesh ring, when the mesh material is still relatively loose, the already flared end 155' of the pipe 100 is pressed into the mesh material. The mesh is then compressed around the flared end, to tightly grip and adhere to the metal mesh. The remaining elements of the alternative construction of FIGS. 30–32 are preferably the same as in the embodiment of FIGS. 27–29. In the embodiment of FIGS. 30–32, the extreme end of bellows 125 is provided with a final convolution 140, which is axially flattened, when flange plate 115 is bolted down against manifold 145, to provide a substantially gas-tight seal between manifold 145 and flange plate 115, without requiring welding or the use of a gasket, such as are known in the art.

In each of the foregoing embodiments, a mesh ring position holder may be fitted into the tube prior to hydroforming of the bellows. Alternatively, since the final convolution may be a different diameter and configuration than the other convolutions of the bellows, the mesh ring insertion and formation of the final convolution may take place after formation of the bellows. The semi-finished bellows may be provided with an elongated cylindrical end section, to accommodate the flange plate and the final convolution. The formation of the surfaces conforming to the inside surface of the aperture of the flange plate, and the formation of the final convolution, may be accomplished by a method such as the insertion and rotation of a mandrel in the cylindrical end of the bellows, after which, the mesh ring may be inserted. Alternatively, the bellows itself may end in an outturned Van-Stone for utilization with a conventional sealing gasket.

It is not strictly necessary that the mesh ring fit with a high degree of radial tightness, into the bellows, or that the bellows, in turn, fit tightly into the contoured inside surface of the aperture of the flange plate. Even after the formation of the bellows and the portions conforming to the inside of the flange plate aperture and the final convolution, the fit between the mesh ring, bellows and flange plate, may have some looseness. As can be seen in FIGS. 28 and 31 (and 33 as described hereinafter), the mesh ring is thicker, in its axial dimension, than the axial depth of the notch or recess formed by aperture 110 and lip 120. Accordingly, when flange plate 115 is tightened down against manifold 145, the mesh ring becomes axially crushed, and clamped between the manifold and lip 120, with a positive axial compressive load. Some radial expansion, both inwardly and outwardly, of the mesh ring, may occur.

Alternatively, the fit between the mesh ring and the adjacent inside surface of the bellows, and/or between the bellows and the inside surface of the aperture of the flange plate may be relatively snug. Any relative movement of the pipe end, relative to the flange plate, may preferably be accommodated by the resilient flexibility of the mesh ring itself, and not by gross movement of the ring relative to the other components.

Figure 33:
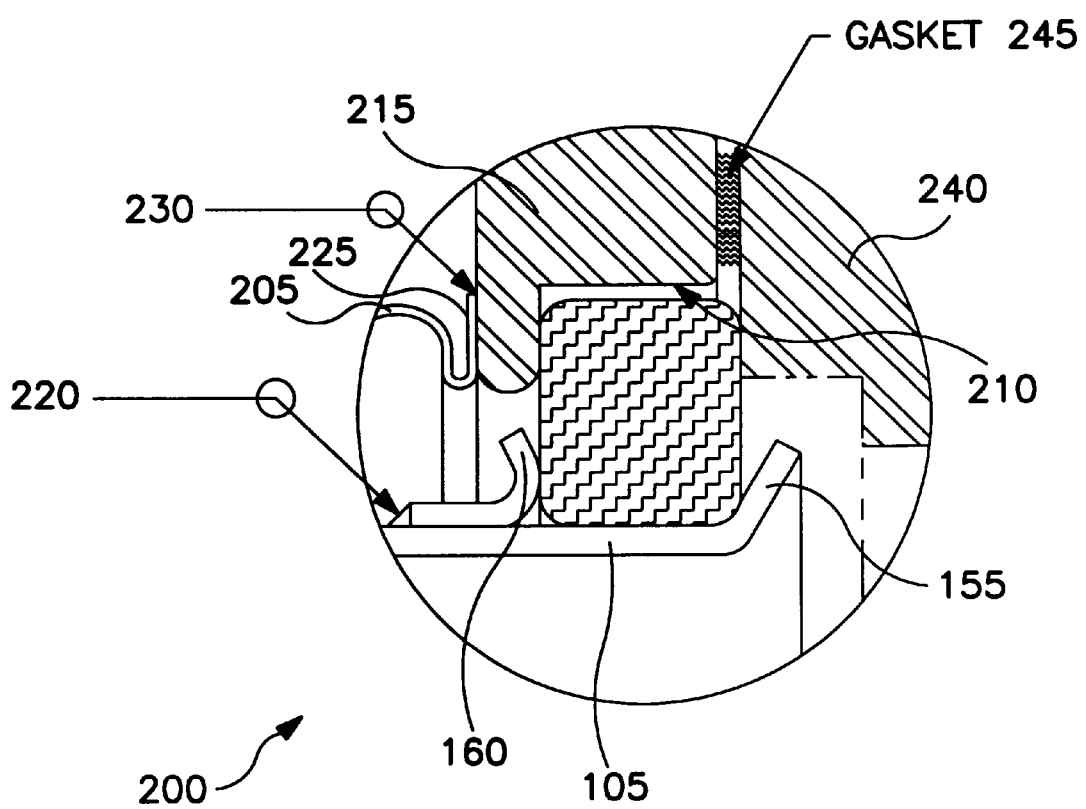
FIG. 33 is an enlarged sectional view of a vibration decoupler apparatus according to another embodiment of the invention.

Still another embodiment of the invention is shown in FIG. 33. In the apparatus 200 of FIG. 33, the bellows 205 does not extend through aperture 210 of flange plate 215. Pipe end 105 may be identical to pipe end 105 of FIGS. 27–29, including turning 155. Flange 160 may also be provided, which, as in the embodiment of FIGS. 27–29, is welded to pipe end 105, at 220. Bellows 205 ends in a radially outwardly extending annular lip 225, which preferably may be affixed to flange plate 215 by weld 230. Mesh ring 235 may be constructed in substantially the same manner as the mesh ring of the embodiment of FIGS. 27–29, but is not radially surrounded by the end of the bellows.

Accordingly, since there is no crushed bellows convolution to form a seal between flange plate 215 and manifold 240, a gasket 245, such as are known in the art, is positioned between flange plate 215 and manifold 240.

In this embodiment, the bellows may be formed by any suitable method, including hydroforming. Hydroforming, while a preferred method, is not required, since the bellows does not pass into or through the aperture in the flange plate. The bellows simply needs to be formed with a suitable amount of material left as a cylindrical neck, which may be trimmed as necessary, and the required radially extending annular lip 225 can be formed.

In a still further alternative embodiment, the bellows may be formed so that the end of the bellows enters into, stops within, but does not pass completely through the aperture in the flange plate. In this embodiment (not shown), the end of the bellows would be affixed to the inside surface of the flange plate, such as by welding. A gasket would still be needed in order to provide a seal between the manifold and the flange plate.

In each of the embodiments of FIGS. 27–33, the bellows, as discussed with respect to the prior embodiments, may be formed from multiple plies of material, in a manner substantially identical to that described with respect to the embodiments of FIGS. 1–26. Although the bellows may be formed, such that the portion of the bellows which passes through the flange plate and forms the crushed bellows seal, may have one or more fewer layers than the majority of the bellows structure, alternatively, the bellows in all of the foregoing embodiments may be formed in such a manner that the same number of layers are present along the entire length of the bellows.

The foregoing embodiments describe and illustrate an end of the bellows passing through the aperture in the flange plate, and employing a last, crushed convolution of the bellows as a seal between the manifold housing (or other structure) and the flange plate. As previously mentioned, the formation of the bellows within the flange plate may be accomplished through hydroforming techniques, as described in detail hereinabove, or by alternative methods, such as spin forming, etc.

In each of the foregoing embodiments, the mesh ring serves to partially shield the bellows from direct exposure to the full force and temperature of the exhaust flow, although some, greatly slowed and reduced temperature leakage through the mesh ring, into the space between the bellows and the pipe end, may occur. In this way, the bellows is protected from the full high temperature flow, lengthening the useful lifespan of the decoupler apparatus.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. A vibration decoupling connector apparatus, for connecting first and second components of a fluid conduit system, comprising:

a mounting member, having an aperture therethrough for the passage of fluid, the aperture having an inside surface, the mounting member being configured for attachment to a structural member in a fluid transport system;

a pipe member, having at least a first end region and a second end region;

a resilient flexible sealing member, substantially surrounding at least a portion of the pipe member, and having two ends, a first of the two ends being operably connected to the first end region of the pipe member, a second of the two ends being operably connected to the mounting member, at least a portion of the second of the two ends of the resilient flexible sealing member being received within the aperture in the mounting member;

an annular vibration damping member, radially positioned between a portion of the second end region of the pipe member, and a portion of the second end of the resilient flexible sealing member, means for axially positioning the annular vibration damping member, relative to the portion of the second end region of the pipe member, the portion of the second end of the resilient flexible sealing member and the aperture of the mounting member, so that the annular vibration damping member is operably and effectively positioned within the region formed by the aperture of the mounting member, the second end region of the pipe member being disposed in vibration absorbing contact with the vibration damping member, for enabling restricted relative axial, lateral and angular movement between the pipe member and the mounting member, when the mounting member is affixed to a structural member in a fluid transport system.

2. The vibration decoupling connector apparatus according to claim 1, wherein the resilient flexible sealing member is positioned substantially against the inside surface of the aperture.

3. The vibration decoupling connector apparatus, according to claim 1, wherein the means for axially positioning the annular vibration damping member comprises:

a first flange member, extending radially outwardly from the second end region of the pipe member;

a second flange member, extending radially outwardly from the second end region of the pipe member, the first and second flange members being axially spaced from one another, with the annular vibration damping member being axially enclosed between the first and second flange members.

4. The vibration decoupling connector apparatus, according to claim 1, wherein the means for axially positioning the annular vibration damping member comprises:

a first flange member, extending radially outwardly from the second end region of the pipe member, at least a portion of the first flange member being substantially enclosed within and engaged by portions of the annular vibration damping member.

5. The vibration decoupling connector apparatus, according to claim 1, further comprising:

means for sealing the resilient sealing member to a structural member in a fluid transport system.

6. The vibration decoupling connector apparatus, according to claim 5, wherein the means for sealing the resilient sealing member to a structural member in a fluid transport system comprises:

a portion of the second end of the resilient flexible sealing member, extending axially beyond the mounting member, and operably configured to be positioned axially between the mounting member and a structural member in a fluid transport system, and further operably configured to substantially circumferentially surround a fluid transport aperture in a structural member in a fluid transport system, so that when the mounting member is affixed to a structural member, a substantially fluid-tight seal is established between the second end of the resilient flexible sealing member, and the structural member.

7. The vibration decoupling apparatus according to claim 6, wherein the resilient flexible sealing member comprises a bellows member having at least two annular convolutions along its length, and the means for sealing the resilient sealing member to a structural member in a fluid transport system comprises:

one of the at least two annular convolutions being positioned axially beyond the mounting member, so that when the mounting member is affixed to a structural member of a fluid transport system, the one of the at least two convolutions becomes captured and crushed between the mounting member and the structural member.

8. The vibration decoupling apparatus according to claim 1, wherein the annular vibration damping member comprises a compressed metal mesh ring.

9. The vibration decoupling apparatus according to claim 1, wherein the annular vibration damping member comprises a compressed ceramic mesh ring.

10. The vibration decoupling apparatus according to claim 1, further comprising an annular substantially rigid guard member, operably connected to the first end region of the pipe member, and substantially surrounding the resilient flexible sealing member.

11. A method for manufacturing a vibration decoupling connector apparatus, for connecting first and second components of a fluid conduit system, comprising the steps of:

configuring a mounting member, with an aperture therethrough for the passage of fluid, the aperture having an inside surface, for attachment to a structural member in a fluid transport system;

substantially surrounding at least a portion of a pipe member, having at least a first end region and a second end region, with a resilient flexible sealing member with two ends;

operably connecting a first of the two ends to the first end region of the pipe member;

operably connecting a second of the two ends to the mounting member, at least a portion of the second of the two ends of the resilient flexible sealing member being received within the aperture in the mounting member;

radially positioning an annular vibration damping member, a portion of the second end region of the pipe member, and a portion of the second end of the resilient flexible sealing member;

axially positioning the annular vibration damping member, relative to the portion of the second end region of the pipe member, the portion of the second end of the resilient flexible sealing member and the inner surface of the aperture of the mounting member, so that the annular vibration damping member is substantially circumferentially surrounded by the inside surface of the aperture of the mounting member, disposing the second end region of the pipe member in vibration absorbing contact with the vibration damping member, for enabling restricted relative axial, lateral and angular movement between the pipe member and the mounting member, when the mounting member is affixed to a structural member in a fluid transport system.

12. The method according to claim 11, further comprising the step of positioning the resilient flexible sealing member substantially against the inside surface of the aperture.

13. The method according to claim 11, wherein the step of axially positioning the annular vibration damping member comprises:

extending a first flange member, radially outwardly from the second end region of the pipe member;

extending a second flange member, radially outwardly from the second end region of the pipe member, axially spacing the first and second flange members from one another, with the annular vibration damping member being axially enclosed between the first and second flange members.

14. The method according to claim 11, wherein the step of axially positioning the annular vibration damping member comprises:

extending a first flange member, radially outwardly from the second end region of the pipe member, substantially enclosing at least a portion of the first flange member within and engaging the portion of the first flange member by portions of the annular vibration damping member.

15. The method according to claim 11, further comprising the step of:

sealing the resilient sealing member to a structural member in a fluid transport system.

16. The method according to claim 15, wherein the step of sealing the resilient sealing member to a structural member in a fluid transport system comprises the step of:

axially extending a portion of the second end of the resilient flexible sealing member, beyond the mounting member, and operably configuring the portion of the second end of the resilient flexible sealing member to be positioned axially between the mounting member and a structural member in a fluid transport system, and further operably configuring the portion of the second end of the resilient flexible sealing member to substantially circumferentially surround a fluid transport aperture in a structural member in a fluid transport system, so that when the mounting member is affixed to a structural member, a substantially fluid-tight seal is established between the second end of the resilient flexible sealing member, and the structural member.

17. The method according to claim 16, wherein the resilient flexible sealing member comprises a bellows member having at least two annular convolutions along its length, and the step of sealing the resilient sealing member to a structural member in a fluid transport system comprises:

axially positioning one of the at least two annular convolutions beyond the mounting member, so that when the mounting member is affixed to a structural member of a fluid transport system, the one of the at least two convolutions becomes captured and crushed between the mounting member and the structural member.

18. The method according to claim 11, wherein the annular vibration damping member comprises a compressed metal mesh ring.

19. The method according to claim 11, wherein the annular vibration damping member comprises a compressed ceramic mesh ring.

20. The method according to claim 11, further comprising the step of:

operably connecting an annular substantially rigid guard member to the first end region of the pipe member, and substantially surrounding the resilient flexible sealing member with the annular substantially rigid guard member.

21. A vibration decoupling connector apparatus, for connecting first and second components of a fluid conduit system, comprising:

a mounting member, having an aperture therethrough for the passage of fluid, the mounting member being configured for attachment to a structural member in a fluid transport system;

a pipe member, having at least a first end region and a second end region;

a resilient flexible sealing member, substantially surrounding at least a portion of the pipe member, and having two ends, a first of the two ends being operably connected to the first end region of the pipe member, a second of the two ends being operably connected to the mounting member;

an annular vibration damping member, radially positioned between a portion of the second end region of the pipe member, and a portion of the mounting member;

means for axially positioning the annular vibration damping member, relative to the portion of the second end region of the pipe member and the aperture of the mounting member, so that the annular vibration damping member is operably and effectively positioned within the region formed by the aperture of the mounting member, the second end region of the pipe member being disposed in vibration absorbing contact with the vibration damping member, for enabling restricted relative axial, lateral and angular movement between the pipe member and the mounting member, when the mounting member is affixed to a structural member in a fluid transport system.

22. A vibration decoupling connector apparatus, for connecting first and second components of a fluid conduit system, comprising:

a mounting member, having an aperture therethrough for the passage of fluid, the mounting member being configured for attachment to a structural member in a fluid transport system;

a pipe member, having at least a first end region and a second end region;

a resilient flexible sealing member, substantially surrounding at least a portion of the pipe member, and having two ends, a first of the two ends being operably connected to the first end region of the pipe member, a second of the two ends being operably connected to the mounting member, a portion of the second of the two ends extending at least partially into the aperture of the mounting member;

an annular vibration damping member, radially positioned between a portion of the second end region of the pipe member, and a portion of the mounting member;

means for axially positioning the annular vibration damping member, relative to the portion of the second end region of the pipe member and the aperture of the mounting member, so that the annular vibration damping member is operably and effectively positioned within the region formed by the aperture of the mounting member, the second end region of the pipe member being disposed in vibration absorbing contact with the vibration damping member, for enabling restricted relative axial, lateral and angular movement between the pipe member and the mounting member, when the mounting member is affixed to a structural member in a fluid transport system.

\* \* \* \* \*